Jan. 18, 1938.  L. L. JONES ET AL  2,105,693
WHISKY AGING APPARATUS
Filed April 18, 1934  4 Sheets-Sheet 2
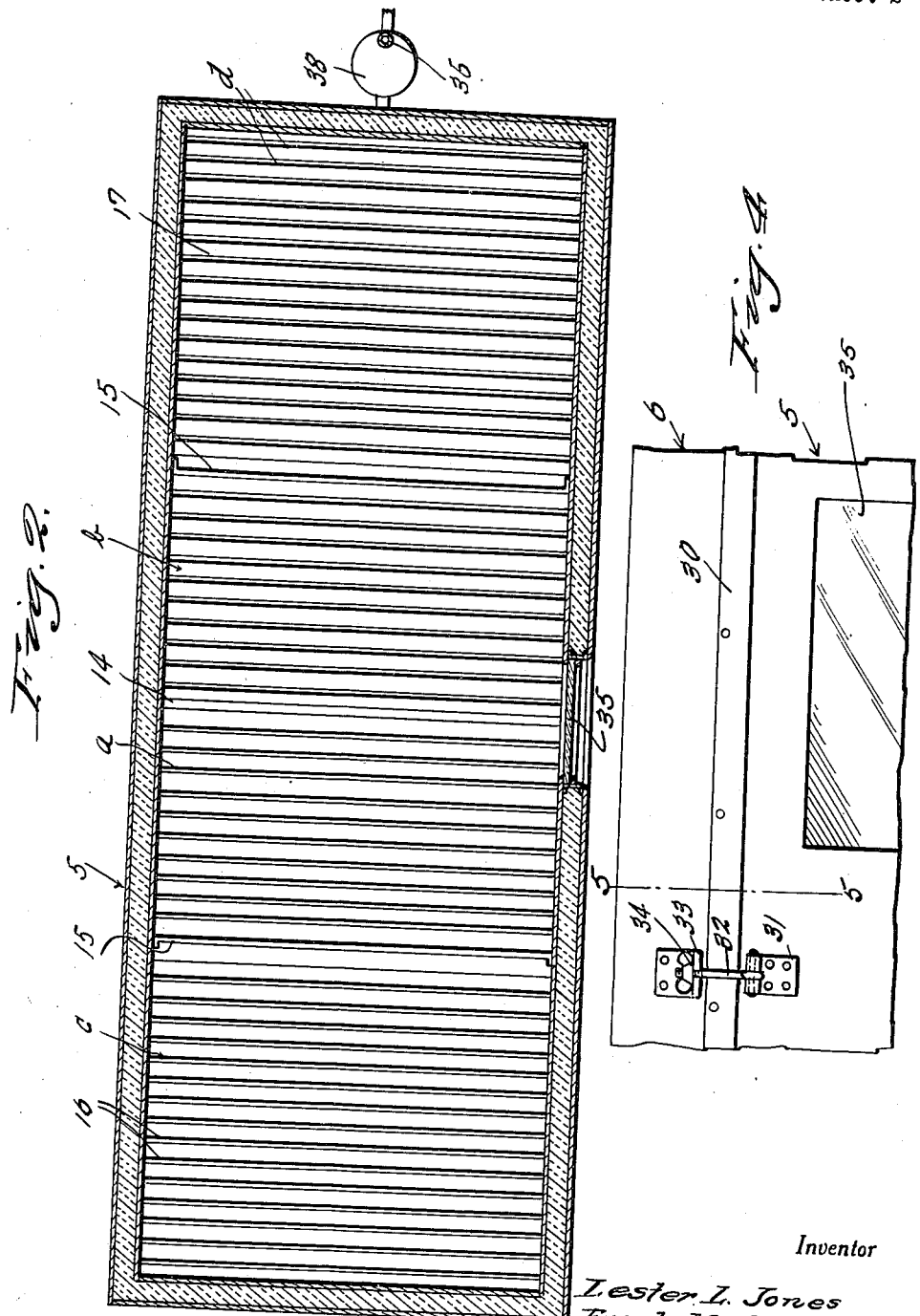
Inventor
Lester L. Jones
Frank Mortellaro
By Clarence A. O'Brien
Attorney Jan. 18, 1938.   L. L. JONES ET AL   2,105,693
WHISKY AGING APPARATUS
Filed April 18, 1934    4 Sheets-Sheet 3
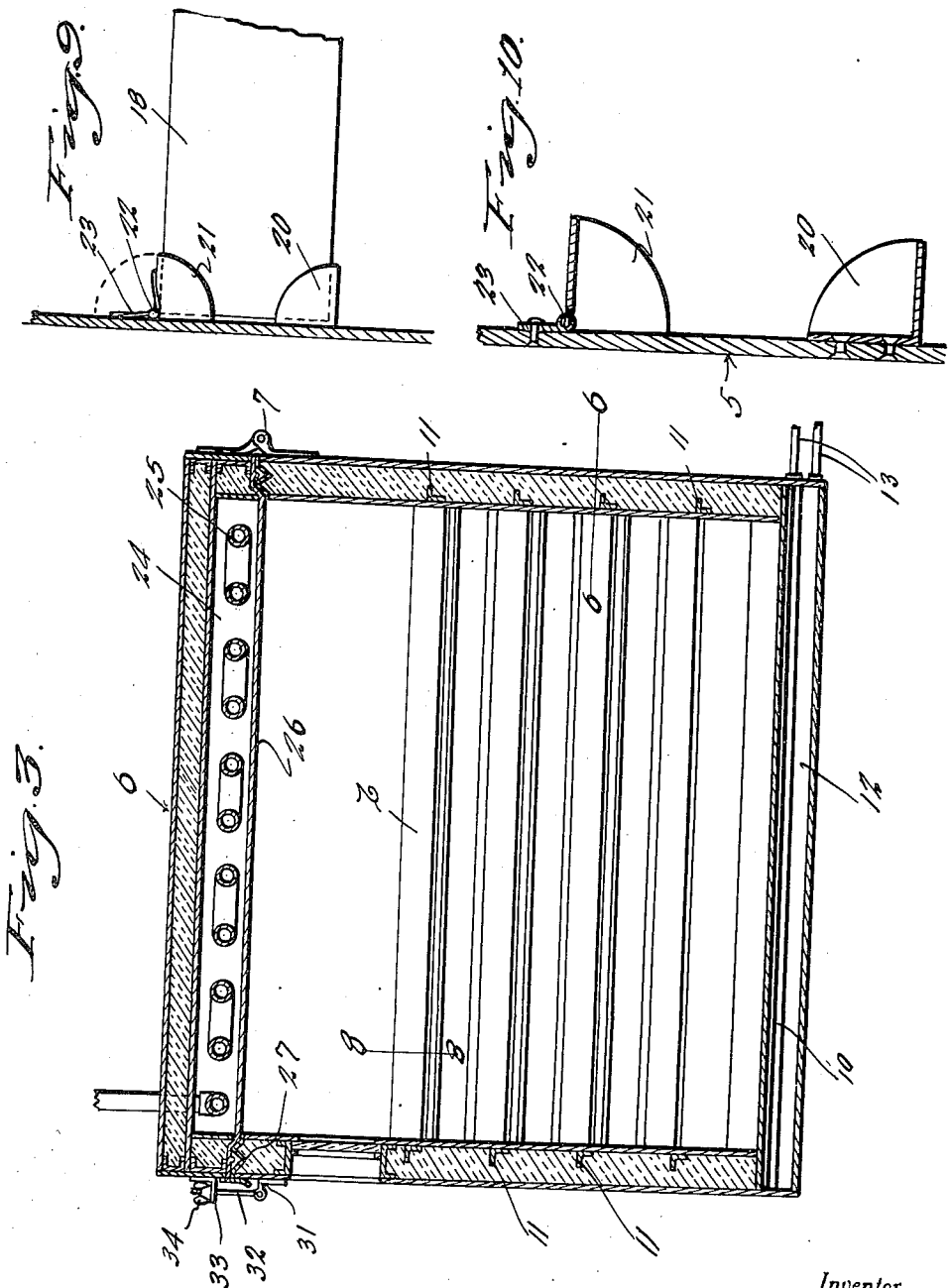

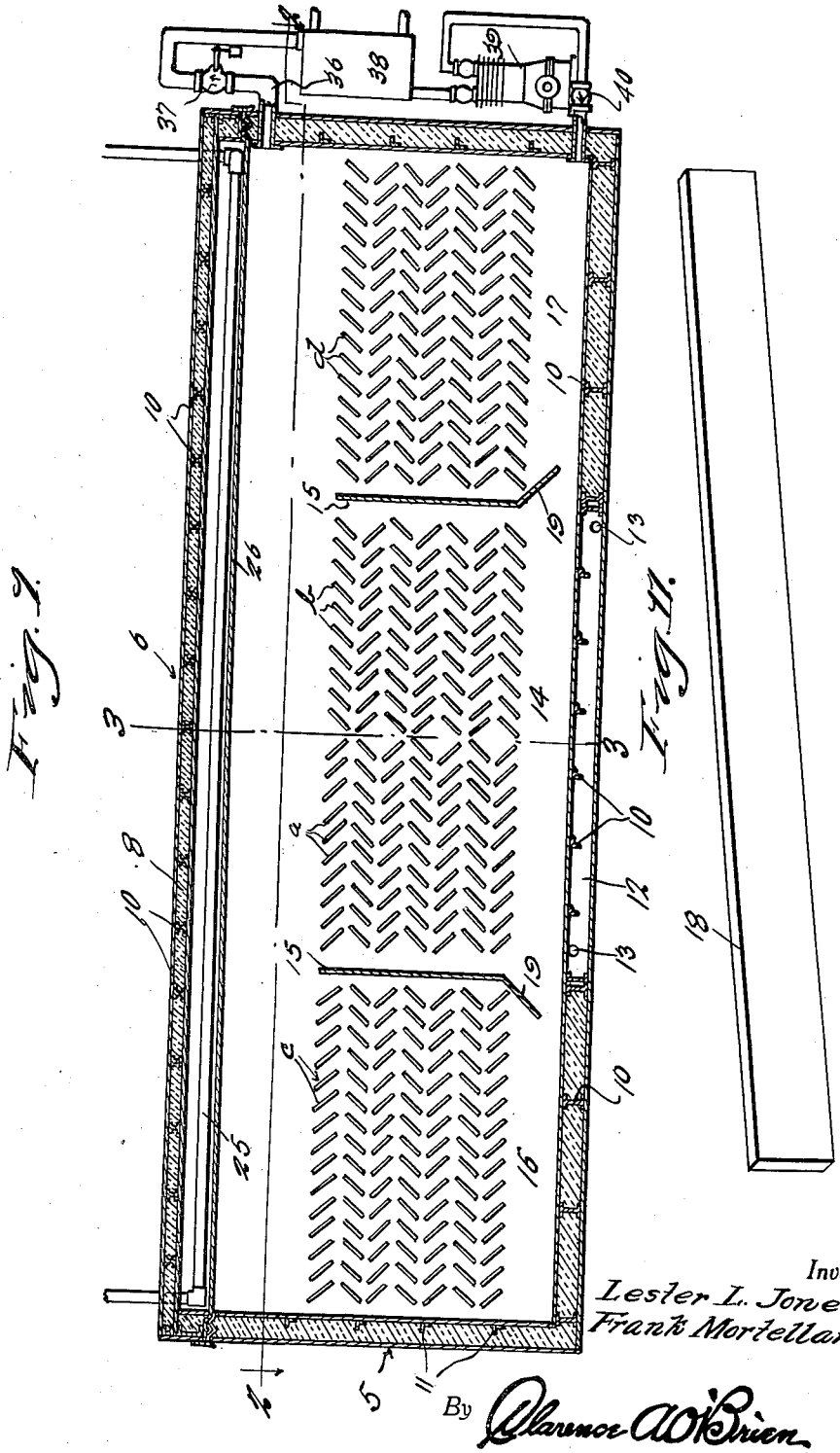

Jan. 18, 1938.                L. L. JONES ET AL                2,105,693
                            WHISKY AGING APPARATUS
                             Filed April 18, 1934            4 Sheets-Sheet 4
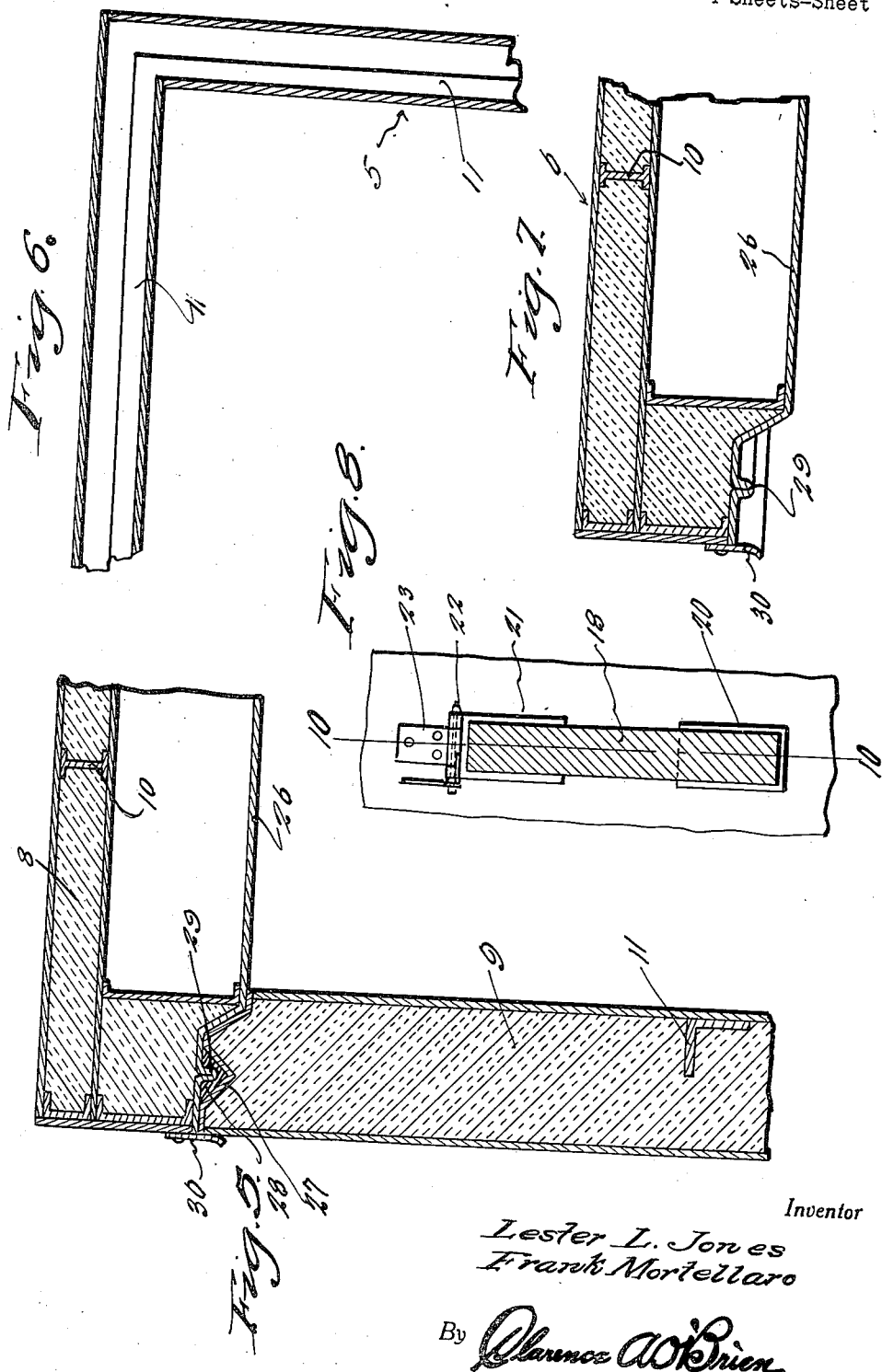
Inventor
Lester L. Jones
Frank Mortellaro
By Clarence A. O'Brien
   Attorney Patented Jan. 18, 1938

2,105,693

UNITED STATES PATENT OFFICE 2,105,693

WHISKY AGING APPARATUS

Lester L. Jones and Frank Mortellaro, Denver, Colo.

Application April 18, 1934, Serial No. 721,217

13 Claims. (Cl. 99—277.1)

The present invention appertains to new and useful improvements in apparatus for aging whisky, the principal object being to provide means whereby whisky can be properly aged to a mellow taste in a very short period of treatment.

Another important object of the present invention is to provide an apparatus for aging whisky wherein heat is employed to not only assist in aging, but to cause a motion of the whisky while under treatment.

Still another important object of the present invention is to provide a whisky treating apparatus wherein whisky is caused to circulate through a number of closely arranged charred wooden members and wherein heat is employed as the medium for promoting this motion of the whisky.

Various other important objects and advantages of the invention will become apparent to the reader of the following specification.

In the drawings:

Figure 1 represents a vertical longitudinal sectional view through the tank.

Figure 2 represents a horizontal sectional view taken substantially on line 2—2 of Figure 1.

Figure 3 represents a vertical transverse sectional view taken substantially on line 3—3 of Figure 1.

Figure 4 represents a fragmentary front elevational view of the tank.

Figure 5 represents an enlarged fragmentary detailed vertical sectional view through one upper corner of the tank.

Figure 6 represents a fragmentary enlarged detailed sectional view taken substantially on line 6—6 of Figure 3.

Figure 7 represents a fragmentary enlarged vertical sectional view through the tank cover.

Figure 8 represents a fragmentary vertical sectional view taken substantially on line 8—8 of Figure 3.

Figure 9 represents a fragmentary vertical sectional view through the tank lining, showing one end of one of the charred slats.

Figure 10 represents an enlarged vertical sectional view through the supporting assembly for one of the slat ends.

Figure 11 represents a perspective view of one of the slats.

Referring to the drawings wherein like numerals designate like parts, it can be seen that numeral 5 generally refers to the tank which is provided with the cover generally referred to by numeral 6, hingedly connected, as at 7, to one side wall of the tank 5.

The top portion of the cover 6 is of double wall construction, the same having insulation 8 therein, as the side and end walls of the cover are insulated.

The end, side and bottom walls of the tank 5 are similarly constructed in double wall fashion and packed with a suitable insulating material 9. The top of the cover 6, within the confines of the insulation 8, is reinforced by I beams 10, while angle irons 11 reinforce the interior of the side and end walls of the tank 5, as well as the bottom wall, the bottom wall being provided at an intermediate portion, with a heating space 12 in which a steam coil 13 or other suitable heating means is trained.

Immediately above the space 12 for the heat source is the whisky rising chamber 14 defined by the vertical partitions 15—15, the partitions 15—15 being sufficiently spaced from the end walls of the tank to provide end chambers 16—17.

Substantially wide slats 18 of charred wood of suitable variety are disposed in horizontal rows both in the chamber 14 and also in the chambers 16—17. The lower end portions of the partitions 15 decline outwardly with respect to the chamber 14, as at 19, so that all whisky heated immediately above the space 12 will be caused to rise upwardly through the slats in the chamber 14. The upper ends of the partitions 15 are spaced from the cover 6 so that there will be ample room for the whisky to rise above the chamber 14 and pass over into the chambers 16—17, from where it returns to the chamber 14.

It will be observed that in the chamber 14 are two separate groups of slats. The slats $a$ of one group are oppositely inclined from the slats $b$ of the other group in each horizontal row, while the slats $c$ in the chamber 16 are oppositely inclined with respect to the slats $d$ in the chamber 17 in regard to the slats on successive horizontal rows. The object in having the slats $a$ and $b$ of the uppermost row in the chamber 14 inclined in opposite directions is to have the whisky as it rises in the chamber 14, be deflected by these slats toward the left and toward the right so that substantially equal amounts will pass into the end chambers 16—17, as the whisky circulates from the chamber 14 over the partitions 15—15 and through the end chambers 16—17 to return under the outwardly disposed lower ends of the partitions to return to the heating chamber 14.

Thus as the whisky immediately above the heat source 13 is heated and reaches the boiling point, it rises in the chamber 14, passing through the zigzaggedly arranged charred slats, to be deflected by the upper row of slats into the end chambers 16—17. In this process, not only does the heat serve to promote circulation in the tank, but also in itself, has the ability to assist in the actual aging of the whisky, although this as a singular fact is already well known in the art, it being in the dual function of the heat source as a promoter of circulation, while incidentally assisting in the aging action of the whisky that instills conciseness and efficiency in this apparatus.

The slats 18 extend transversely in the chambers 14, 16 and 17 and each slat is supported at each end by a pair of members secured to the corresponding side wall of the tank. The lower member is in the form of a pocket or saddle 20 stationarily secured to the tank, while the upper member 21 is of similar shape to engage the upper corner of the slat, but this member 21 is hingedly connected, as at 22, by a spring hinge to the wall plate 23.

Thus it can be seen that by lifting upwardly on the slats, the same can be readily removed and replaced at will.

Referring to Figure 3, it can be seen that within the cover 6 is a compartment 24 for the brine coil 25, the bottom 26 of the cover being relatively thin, so that whisky evaporation can be condensed at this point.

While the means for fastening the cover to the tank and sealing the cover to the tank is optional, it is preferred that the upper edge of the tank be provided with a grooveway 27 in which a suitable sealing substance 28 is placed and when the cover is in closed position upon the tank, the depending tongue 29 on the cover will bear into this sealing substance 28, while a band 30 extending around the lower portion of the cover, will overlap this joint at the outside of the tank.

Figure 3 shows that on the opposite side of the tank from the hinges 7, brackets 31 will support swingable bolt members 32 which can be swung into the yokes 33 on the cover 6 and be secured in place by wing nuts 34 on the bolts fed downwardly against the yokes 33.

The front side of the tank will preferably have a window 35 so that the interior of the tank can be inspected from time to time to see the action of the whisky and the condition of the slats.

Numeral 36 represents a pressure outlet pipe which has a safety valve 37 therein. This pipe 36 leads to the condenser 38, in which the whisky vapor is condensed and passes to the compressor 39 which serves to force the liquid through the check valve 40 back into the tank 5. Thus any vapors produced by the heating of the liquid in the tank will be drawn therefrom and condensed and passed back into the tank.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. Whisky aging apparatus comprising a tank having closely spaced charred oak members arranged therein to baffle vertical flow of whisky in the tank, heating means at the bottom of the tank for producing upward movement of the whisky in a heated condition through and in reactive contact with said charred oak members, cooling means at the top of the tank producing condensation of vapors emanating from the upwardly moved whisky, and exterior pump means having its intake at the top of the tank for drawing off vapors and condensate therein, said pump having its discharge connected to the lower part of the tank for returning the condensate to the lower part of the body of the whisky and for assisting in the circulation of the whisky in the tank, said pump means including a positively cooled condenser whereby the said vapors are positively liquefied before return to the main body of the whisky.

2. Whisky aging apparatus comprising a tank having closely spaced charred oak members arranged therein to baffle vertical flow of whisky in the tank, heating means at the bottom of the tank for producing rising of the whisky in a heated condition through and in reactive contact with said charred oak members, cooling means at the top of the tank producing condensation of vapors emanating from the risen whisky, said charred oak members comprising horizontal slats, said slats being spaced above each other and tilted transversely with respect to each other to define tortuous vertical channels through which the whisky rises.

3. Whisky aging apparatus comprising a tank having closely spaced flat charred oak slats arranged horizontally therein to baffle vertical flow of whisky in the tank, heating means at the bottom of the tank for producing rising of the whisky in a heated condition through and in reactive contact with said charred oak slats, and cooling means at the top of the tank producing condensation of vapors emanating from the risen whisky, said charred oak slats being spaced above each other in tiers and transversely tilted with respect to each other to define tortuous vertical channels through which the whisky rises and sinks, said slats being arranged in two side groups and one central group, a first vertical partition between one side group and the central group, a second vertical partition between said central group and the remaining side group.

4. Whisky aging apparatus comprising a tank having closely spaced charred oak slats arranged horizontally therein to baffle vertical flow of whisky in the tank, heating means at the bottom of the tank for producing rising of the whisky in a heated condition through and in reactive contact with said charred oak slats, cooling means at the top of the tank producing condensation of vapors emanating from the whisky, said charred oak slats being spaced above each other in tiers and transversely tilted with respect to each other to define tortuous vertical channels through which the whisky circulates in vertical directions, said slats being arranged in two side groups and one central group, a first vertical partition between one side group and the central group, a second vertical partition between said central group and the remaining side group, the top slats of the central group being laterally outwardly inclined so as to direct the whisky rising through the central group over the tops of the partitions and toward the side groups, said cooling means being arranged to sufficiently cool the whisky passing over the tops of the partitions to impart thereto a tendency to sink through the side groups toward the lower part of the tank.

5. Whisky aging apparatus comprising a tank having closely spaced charred oak members arranged therein to baffle vertical flow of whisky in the tank, heating means at the bottom of the tank for producing rising of the whisky in a heated condition through and in reactive contact with said charred oak members, cooling means at the top of the tank producing condensation of vapors emanating from the whisky, said heating means being confined to a central part of the bottom of the tank so as to impart a natural rising tendency principally to the central portion of the body of whisky while failing to so affect the portions of the body of the whisky at the sides of said central portion thereof, thereby producing a natural circulation of the whisky.

6. Whisky aging apparatus comprising a tank having closely spaced charred oak members arranged therein to baffle vertical flow of whisky in the tank, heating means at the bottom of the tank for producing rising of the whisky in a heated condition through and in reactive contact with said charred oak members, cooling means at the top of the tank producing condensation of vapors emanating from the whisky, said heating means being confined to a central part of the bottom of the tank so as to impart a natural rising tendency principally to the central portion of the body of whisky while failing to so affect the portions of the body of the whisky at the sides of said central portion thereof, thereby producing a natural circulation of the whisky, said cooling means extending substantially entirely across the top of the tank and acting to sufficiently cool the risen whisky as to cause the same to move toward the sides away from said central portion of the whisky and sink naturally.

7. Whisky aging apparatus comprising a tank having closely spaced charred oak members arranged therein to baffle vertical flow of whisky in the tank, heating means at the bottom of the tank for producing rising of the whisky in a heated condition through and in reactive contact with said charred oak members, cooling means at the top of the tank producing condensation of vapors emanating from the whisky, said heating means being confined to a central part of the bottom of the tank so as to impart a natural rising tendency principally to the central portion of the body of whisky while failing to so affect the portions of the body of the whisky at the sides of said central portion thereof, thereby producing a natural circulation of the whisky, and vertical partitions on opposite sides of said central part of the bottom of the tank and acting to keep separated the cooler side portions of the whisky from the hotter central part of the whisky, said partitions having their lower ends upwardly spaced from the bottom of the tank to enable the descending cooler portions of the whisky to flow to the central part of the bottom of the tank to be heated.

8. Whisky aging apparatus comprising a closed tank including a top wall and a bottom wall, said bottom wall having a hollow portion constituting a heating chamber, heating means located in said heating chamber, a horizontal partition at the upper part of the interior of said tank and spaced below said top wall of the tank and defining a cooling chamber, and cooling means located in said cooling chamber, said heating chamber being located intermediate the sides of said tank so as to produce rising circulation of the whisky at the middle of the tank and consequent downward circulation of the whisky at the sides of the tank, a first battery of closed spaced charred oak slats in said tank and over said heating chamber and through which the heated whisky rises in the tank, and second and third batteries of closed spaced charred oak slats at opposite sides of said first battery and through which the whisky cooled by said cooling chamber circulates downwardly.

9. Whisky aging apparatus comprising a closed tank including a top wall and a bottom wall, said bottom wall having a hollow portion constituting a heating chamber, heating means located in said heating chamber, a horizontal partition at the upper part of the interior of said tank and spaced below said top wall of the tank and defining a cooling chamber, and cooling means located in said cooling chamber, said heating chamber being located intermediate the ends of said tank so as to produce rising circulation of the whisky at the middle of the tank and consequent downward circulation of the whisky at the opposite ends of the tank, a first battery of closed spaced charred oak slats in said tank and over said heating chamber and through which the heated whisky rises in the tank, and second and third batteries of closed spaced charred oak slats at opposite sides of said first battery and through which the whisky cooled by said cooling chamber circulates downwardly.

10. Whisky aging apparatus comprising a closed tank including a top wall and a bottom wall, said bottom wall having a hollow portion constituting a heating chamber, heating means located in said heating chamber, a horizontal partition at the upper part of the interior of said tank and spaced below said top wall of the tank and defining a cooling chamber, and cooling means located in said cooling chamber, said heating chamber being located intermediate the ends of said tank so as to produce rising circulation of the whisky at the middle of the tank and consequent downward circulation of the whisky at the opposite ends of the tank, a first battery of closed spaced charred oak slats in said tank and over said heating chamber and through which the heated whisky rises in the tank, and second and third batteries of closed spaced charred oak slats at opposite sides of said first battery and through which the whisky cooled by said cooling chamber circulates downwardly, and vertical partitions between said first battery and the second and third batteries.

11. Whisky aging apparatus comprising a closed tank including a top wall and a bottom wall, said bottom wall having a hollow portion constituting a heating chamber, heating means located in said heating chamber, a horizontal partition at the upper part of the interior of said tank and spaced below said top wall of the tank and defining a cooling chamber, and cooling means located in said cooling chamber, said heating chamber being located intermediate the ends of said tank so as to produce rising circulation of the whisky at the middle of the tank and consequent downward circulation of the whisky at the opposite ends of the tank, a first battery of closed spaced charred oak slats in said tank and over said heating chamber and through which the heated whisky rises in the tank, and second and third batteries of closed spaced charred oak slats at opposite sides of said first battery and through which the whisky cooled by said cooling chamber circulates downwardly, and vertical partitions between said first battery and the second and third batteries, said partitions extending across the interior of said tank having their lower edges upwardly spaced from the bottom of the tank.

12. Whisky aging apparatus comprising a closed tank including a top wall and a bottom wall said bottom wall having a hollow portion constituting a heating chamber, heating means located in said heating chamber, a horizontal partition at the upper part of the interior of said tank and spaced below said top wall of the tank and defining a cooling chamber, and cooling means located in said cooling chamber, said heating chamber being located intermediate the ends of said tank so as to produce rising circulation of the whisky at the middle of the tank and consequent downward circulation of the whisky at the opposite ends of the tank, a first battery of closed spaced charred oak slats in said tank and over said heating chamber and through which the heated whisky rises in the tank, and second and third batteries of closed spaced charred oak slats at opposite sides of said first battery and through which the whisky cooled by said cooling chamber circulates downwardly, and vertical partitions between said first battery and the second and third batteries, said partitions extending across the interior of said tank having their lower edges upwardly spaced from the bottom of the tank, each of said batteries comprising vertically spaced horizontal rows of horizontally disposed elongated flat charred oak slats, said slats being transversely tilted.

13. Whisky aging apparatus comprising a closed tank including a top wall and a bottom wall, said bottom wall having a hollow portion constituting a heating chamber, heating means located in said heating chamber, a horizontal partition at the upper part of the interior of said tank and spaced below said top wall of the tank and defining a cooling chamber, and cooling means located in said cooling chamber, said heating chamber being located intermediate the ends of said tank so as to produce rising circulation of the whisky at the middle of the tank and consequent downward circulation of the whisky at the opposite ends of the tank, a first battery of closed spaced charred oak slats in said tank and over said heating chamber and through which the heated whisky rises in the tank, and second and third batteries of closed spaced charred oak slats at opposite sides of said first battery and through which the whisky cooled by said cooling chamber circulates downwardly, and vertical partitions between said first battery and the second and third batteries, said partitions extending across the interior of said tank having their lower edges upwardly spaced from the bottom of the tank, each of said batteries comprising vertically spaced horizontal rows of horizontally disposed elongated flat charred oak slats, said slats being transversely tilted, the slats of successive rows being oppositely tilted whereby tortuous passages for the whisky are produced ensuring intimate contact of the whisky with the charred oak slats.

LESTER L. JONES.
FRANK MORTELLARO.